United States Patent
Hsun

(10) Patent No.: US 9,251,613 B2
(45) Date of Patent: Feb. 2, 2016

(54) SYSTEMS AND METHODS FOR AUTOMATICALLY APPLYING EFFECTS BASED ON MEDIA CONTENT CHARACTERISTICS

(71) Applicant: Cyberlink Corp., Shindian, Taipei (TW)

(72) Inventor: Chen Yen Hsun, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 121 days.

(21) Appl. No.: 14/247,492

(22) Filed: Apr. 8, 2014

(65) Prior Publication Data

US 2015/0117777 A1 Apr. 30, 2015

Related U.S. Application Data

(60) Provisional application No. 61/896,170, filed on Oct. 28, 2013.

(51) Int. Cl.
*G06T 7/00* (2006.01)
*G06T 11/60* (2006.01)

(52) U.S. Cl.
CPC .............. *G06T 11/60* (2013.01); *G06T 7/0051* (2013.01); *G06T 7/0081* (2013.01); *G06T 2207/20144* (2013.01)

(58) Field of Classification Search
None
See application file for complete search history.

(56) References Cited

U.S. PATENT DOCUMENTS

| | | | | |
|---|---|---|---|---|
| 6,661,918 | B1 * | 12/2003 | Gordon | G06K 9/38 382/164 |
| 8,265,385 | B2 | 9/2012 | Hong et al. | |
| 2004/0047513 | A1 * | 3/2004 | Kondo | G06T 7/403 382/254 |
| 2004/0062439 | A1 * | 4/2004 | Cahill | G06T 5/50 382/173 |
| 2007/0262985 | A1 * | 11/2007 | Watanabe | H04N 13/0018 345/420 |
| 2009/0087024 | A1 * | 4/2009 | Eaton | G06K 9/00335 382/103 |
| 2010/0119149 | A1 * | 5/2010 | Hong | H04N 9/643 382/167 |
| 2010/0266207 | A1 * | 10/2010 | Zhang | G06T 5/003 382/195 |
| 2011/0090311 | A1 * | 4/2011 | Fang | H04N 7/15 348/43 |

(Continued)

FOREIGN PATENT DOCUMENTS

WO 2012139232 A1 10/2012

*Primary Examiner* — Sean Motsinger

(74) *Attorney, Agent, or Firm* — McClure, Qualey & Rodack, LLP

(57) ABSTRACT

Disclosed are systems and methods for automatically applying special effects based on media content characteristics. A digital image is obtained and depth information in the digital image is determined. A foreground region and a background region in the digital image are identified based on the depth information. First and second effects are selected from a grouping of effects, where the first effect is applied to at least a portion of the foreground region and the second effect is applied to at least a portion of the background region.

19 Claims, 8 Drawing Sheets

(56) References Cited

U.S. PATENT DOCUMENTS

| | | | |
|---|---|---|---|
| 2011/0149098 A1* | 6/2011 | Ahn | H04N 5/232 348/222.1 |
| 2011/0158504 A1 | 6/2011 | Turner et al. | |
| 2011/0211754 A1* | 9/2011 | Litvak | G06K 9/00375 382/165 |
| 2013/0044183 A1* | 2/2013 | Jeon | H04N 19/103 348/43 |
| 2014/0037213 A1* | 2/2014 | Niederberger | G06T 11/00 382/195 |
| 2014/0368506 A1* | 12/2014 | Abbott | G06T 11/001 345/426 |
| 2015/0116546 A1* | 4/2015 | Tanaka | H04N 5/2621 348/239 |
| 2015/0117777 A1* | 4/2015 | Hsun | G06T 11/60 382/173 |

* cited by examiner

SYSTEMS AND METHODS FOR AUTOMATICALLY APPLYING EFFECTS BASED ON MEDIA CONTENT CHARACTERISTICS

CROSS-REFERENCE TO RELATED APPLICATION

This application claims priority to, and the benefit of, U.S. Provisional patent application entitled, "Systems and Methods for Applying Effects based on Media Content," having Ser. No. 61/896,170, filed on Oct. 28, 2013, which is incorporated by reference in its entirety.

TECHNICAL FIELD

The present disclosure generally relates to editing digital content and more particularly, to a system and method for automatically applying special effects based on media content characteristics.

BACKGROUND

With the ever-growing amount of content available to consumers through the Internet and other sources, consumers have access to a vast amount of digital content. Furthermore, the availability of multimedia content in a wide array of digital formats facilitates distribution of multimedia content due to the high degree of portability. With existing media editing tools, users can manually edit digital photos to achieve a desired effect or style. However, while many media editing tools are readily available, the editing process can be tedious and time-consuming.

SUMMARY

Briefly described, one embodiment, among others, is a method implemented in a media editing apparatus that comprises obtaining a digital image, determining depth information in the digital image, and determining a foreground region and a background region in the digital image based on the depth information. The method further comprises selecting a first effect from a grouping of effects, selecting a second effect from the grouping of effects, applying the first effect to at least a portion of the foreground region, and applying the second effect to at least a portion of the background region.

Another embodiment is a media editing system that comprises a processor and at least one application executable in the processor. The at least one application comprises a media interface configured to obtain a digital image, a depth analyzer configured to determine depth information in the digital image, and a region parser configured to determine a foreground region and a background region in the digital image based on the depth information. The at least one application further comprises an effect selector configured to select a first effect from a grouping of effects, the effect selector being further configured to select a second effect from the grouping of effects. The at least one application also comprises an image editor configured to apply the first effect to at least a portion of the foreground region, the effect selector configured to apply the second effect to at least a portion of the background region.

Another embodiment is a non-transitory computer-readable medium embodying a program executable in a computing device. The program comprises code that obtains a digital content comprising one of: a digital image; and a frame in a video sequence. The program further comprises code that generates a depth mask based on depth information in the digital content, code that determines an order of objects in the digital content based on a relative depth of each object specified in the depth mask, and code that categorizes each of the objects as one of a background object and a foreground object based on the order of objects. The program further comprises code that selects a first effect and a second effect from a grouping of effects, code that applies the first effect to at least a portion of the foreground objects, and code that applies the second effect to at least a portion of the background objects.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for automatically incorporating effects into media content based on characteristics of the media content. Specifically, multiple effects may be applied to a digital image or a video frame according to the depth information where the foreground and background regions of the digital image are identified based on the depth information. For various embodiments, a video frame is analyzed and a depth map is derived. Foreground objects are identified and a foreground region is defined using the depth map. Similarly, background objects are identified and a background region is defined. Multiple effects may be combined into a series of subgroups, where each subgroup may include one or more effects for the foreground and one or more effects for the background. Foreground effects are applied within the foreground region of the digital image or video frame, and background effects are applied within the background region of current video frame. Furthermore, the user may view the real time results using the editing technique above. A description of a system for facilitating image editing is now described followed by a discussion of the operation of the components within the system.

Figure 1:
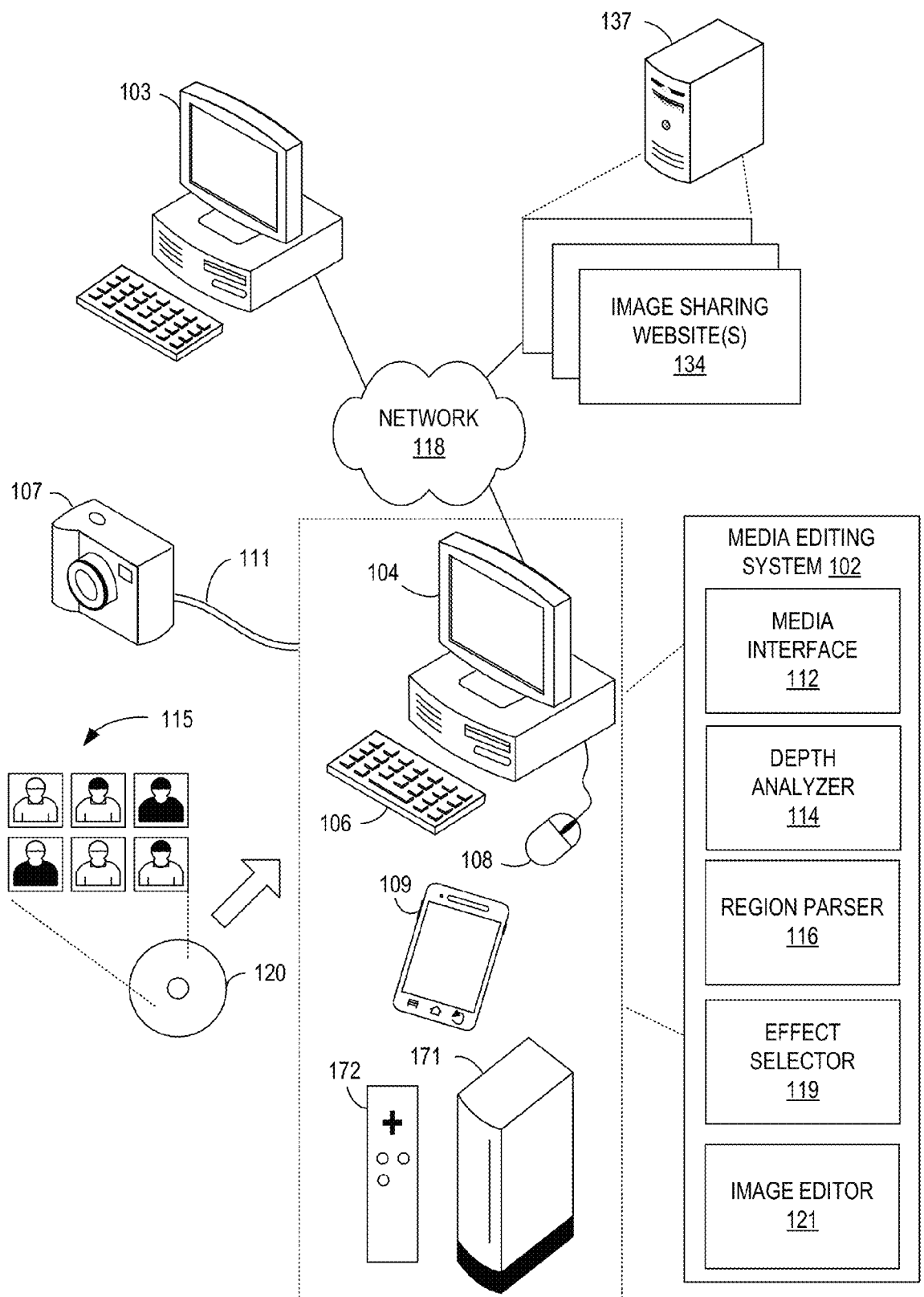
FIG. 1 is a block diagram of a networked environment in which embodiments of a media editing system may be implemented in accordance with various embodiments of the present disclosure.

FIG. 1 is a block diagram of a media editing system 102 in which embodiments of the image editing techniques disclosed herein may be implemented. The media editing system 102 may be embodied, for example, as a desktop computer, computer workstation, laptop, a smartphone 109, a tablet, or other computing platform and includes a display 104 and may include such input devices as a keyboard 106 and a mouse 108.

For embodiments where the media editing system 102 is embodied as a smartphone 109 or tablet, the user may interface with the media editing system 102 via a touchscreen interface (not shown). In other embodiments, the media editing system 102 may be embodied as a video gaming console 171, which includes an image game controller 172 for receiving user preferences. For such embodiments, the image gaming console 171 may be connected to a television (not shown) or other display.

The media interface 112 in the media editing system 102 is configured to retrieve digital media content 115 stored on a storage medium 120 such as, by way of example and without limitation, a compact disc (CD) or a universal serial bus (USB) flash drive, wherein the digital media content 115 may then be stored locally on a hard drive of the media editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. The digital media content 115 may also be encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), MPEG-4 (MP4), Matroska (MKV), or any number of other digital formats.

As depicted in FIG. 1, the media editing system 102 may also be configured to retrieve digital media content 115 directly from a digital recording device 107 where a cable 111 or some other interface may be used for coupling the digital recording device 107 to the media editing system 102. The media editing system 102 may support any one of a number of common computer interfaces, such as, but not limited to, IEEE-1394 High Performance Serial Bus (Firewire), USB, a serial connection, and a parallel connection.

The digital recording device 107 may also be coupled to the media editing system 102 over a wireless connection or other communication path. The media editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the media editing system 102 may receive digital media content 115 from another computing system 103. Alternatively, the media editing system 102 may access one or more image sharing websites 134 hosted on a server 137 via the network 118 to retrieve digital media content 115.

Various applications and/or other functionality may be executed in the media editing system 102 according to various embodiments. The components executed on the media editing system 102 include, for example, a media interface 112, a depth analyzer 114, a region parser 116, an effect selector 119, an image editor 121, and other applications, services, processes, systems, engines, or functionality not discussed in detail herein.

The depth analyzer 114 is executed to determine depth information in a digital image obtained by the media interface 112, where the digital image may comprise a digital photo or a frame from a video. As described in more detail below, the depth information may comprise a depth map corresponding to objects/regions within the digital image.

The region parser 116 is executed to determine a foreground region and a background region in the digital image based on the depth information derived by the depth analyzer 114. The effect selector 119 is executed to select a first effect and a second effect from a grouping of effects. The image editor 121 is executed to apply the first effect to at least a portion of the foreground region. The image editor 121 applies the second effect to at least a portion of the background region such that multiple effects are automatically applied to the same digital image.

Figure 2:
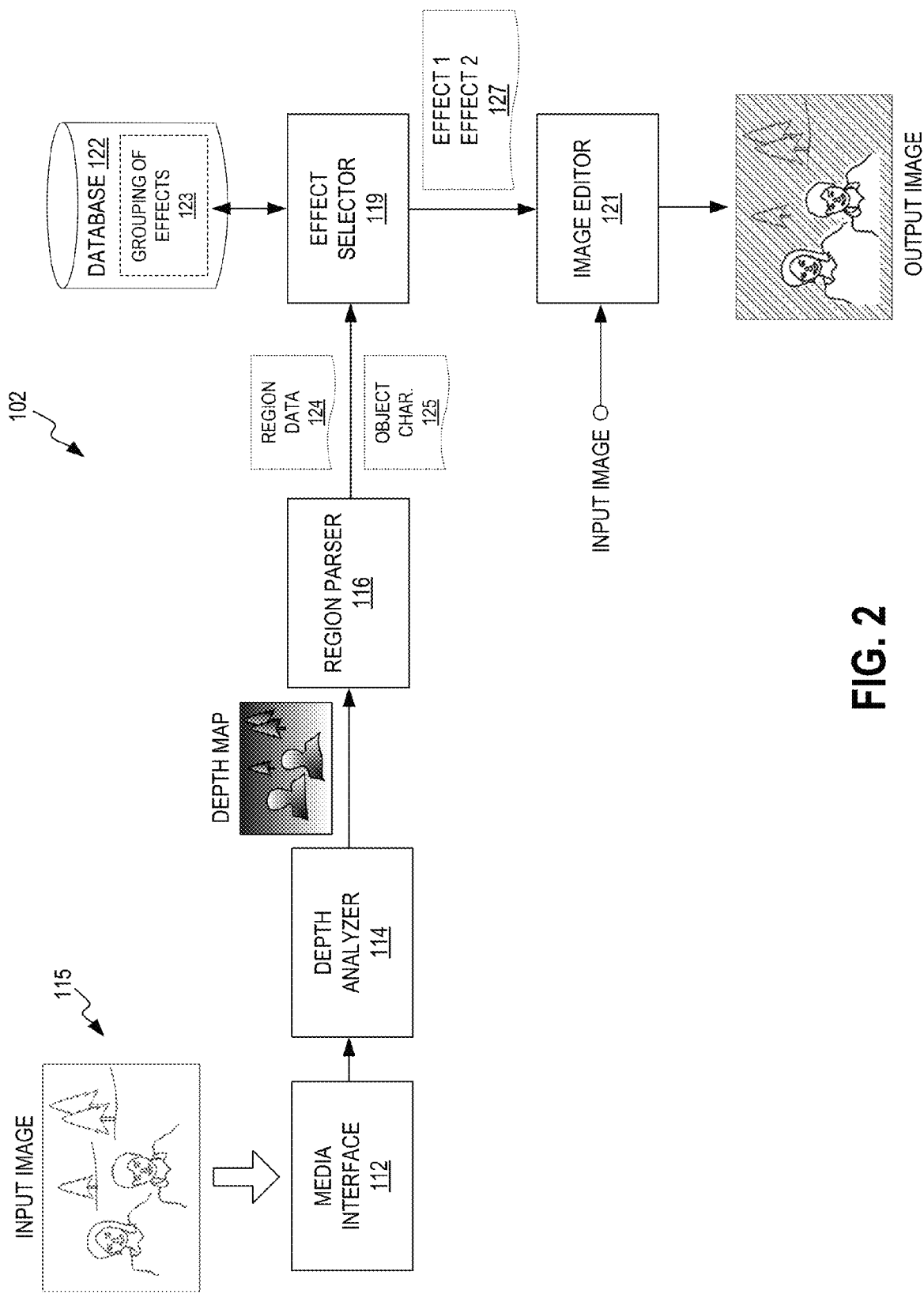
FIG. 2 illustrates the process flow between various components of the media editing system of FIG. 1.

FIG. 2 illustrates the process flow between various components of the media editing system 102 of FIG. 1. To begin, the media interface 112 obtains an input image, where the media content may comprise, for example, a digital photo captured by a digital recording device 107 (FIG. 1). The input image may also comprise a series of frames from a video sequence captured by the digital recording device 107. The depth analyzer 114 processes the input image and generates a depth map based on depth information corresponding to the content in the input image. The region parser 116 receives the depth map and identifies a foreground region and a background region within the input image. For some embodiments, the region parser 116 may be further configured to identify one or more objects within the foreground and background regions of the input image. As described in detail below, the region parser 116 may also determine characteristics of the identified objects.

The effect selector 119 receives region data 124 and object characteristics 125 from the region parser 116 and selects a subgroup 127 of effects from a grouping of effects 123 stored in a database 122, where each subgroup 127 comprises at least a first effect and a second effect. The image editor 121 then applies the first effect to either the entire foreground region or to specific objects within the foreground region of the input image. The second effect is applied to the entire background region or to specific objects within the background region. The effects may comprise sharpening, blurring, color change, warping, replacement of an image, or any image processing based on the input image. Thus, the resultant image can be more unique.

Figure 3:
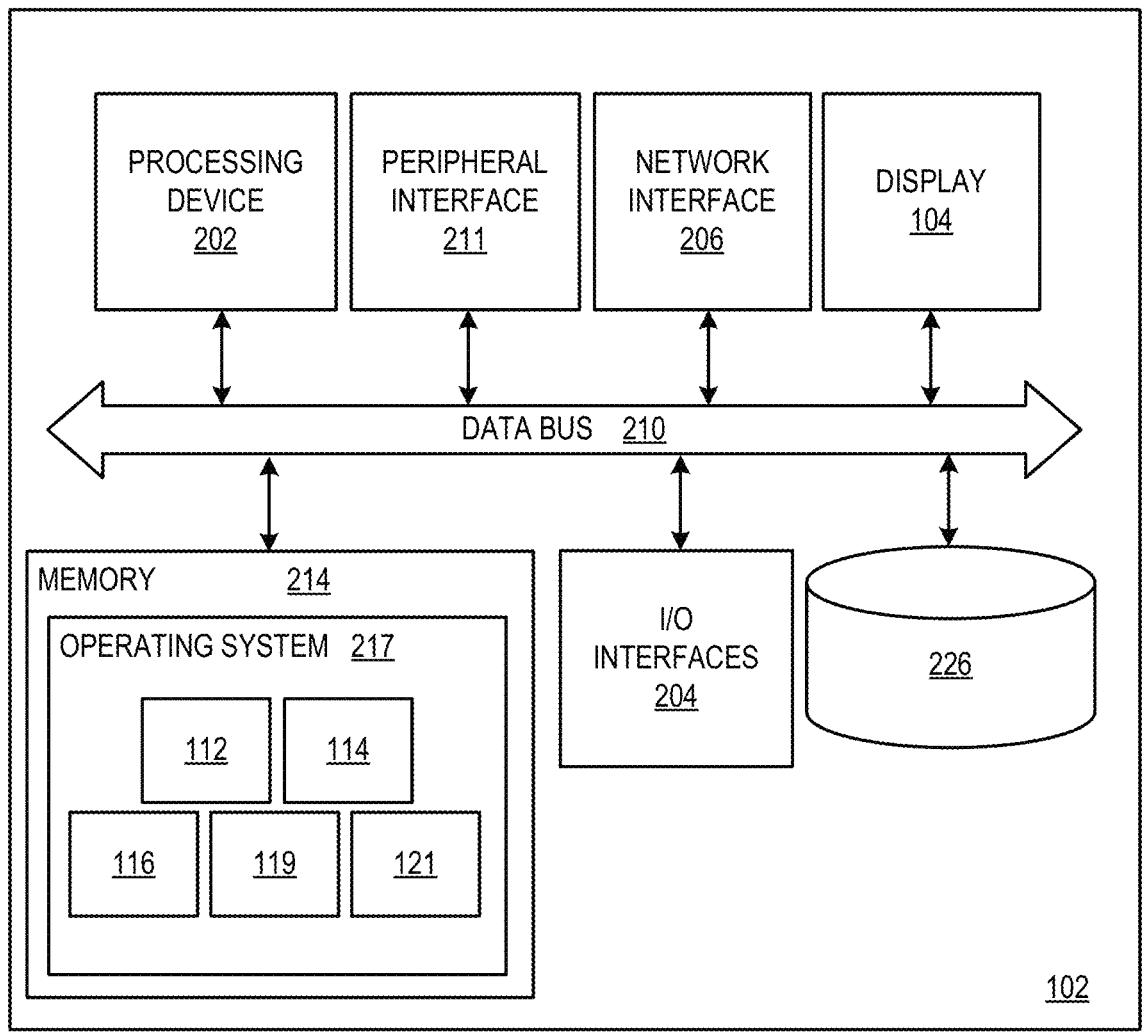
FIG. 3 is a detailed view of the media editing system of FIG. 1 in accordance with various embodiments of the present disclosure.

FIG. 3 is a schematic diagram of the media editing system 102 shown in FIG. 1. The media editing system 102 may be embodied in any one of a wide variety of wired and/or wireless computing devices, such as a desktop computer, portable computer, dedicated server computer, multiprocessor computing device, smartphone, tablet computing device, and so forth. As shown in FIG. 2, the media editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the media editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, depth analyzer 114, region parser 116, effect selector 119, image editor 121) of the media editing system 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the media editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The media editing system 102 may communicate with one or more computing devices via the network interface 206 over the network 118 (FIG. 1). The media editing system 102 may further comprise mass storage 226. The peripheral interface 211 supports various interfaces including, but not limited to IEEE-1394 High Performance Serial Bus (Firewire), USB, a serial connection, and a parallel connection.

Figure 4:
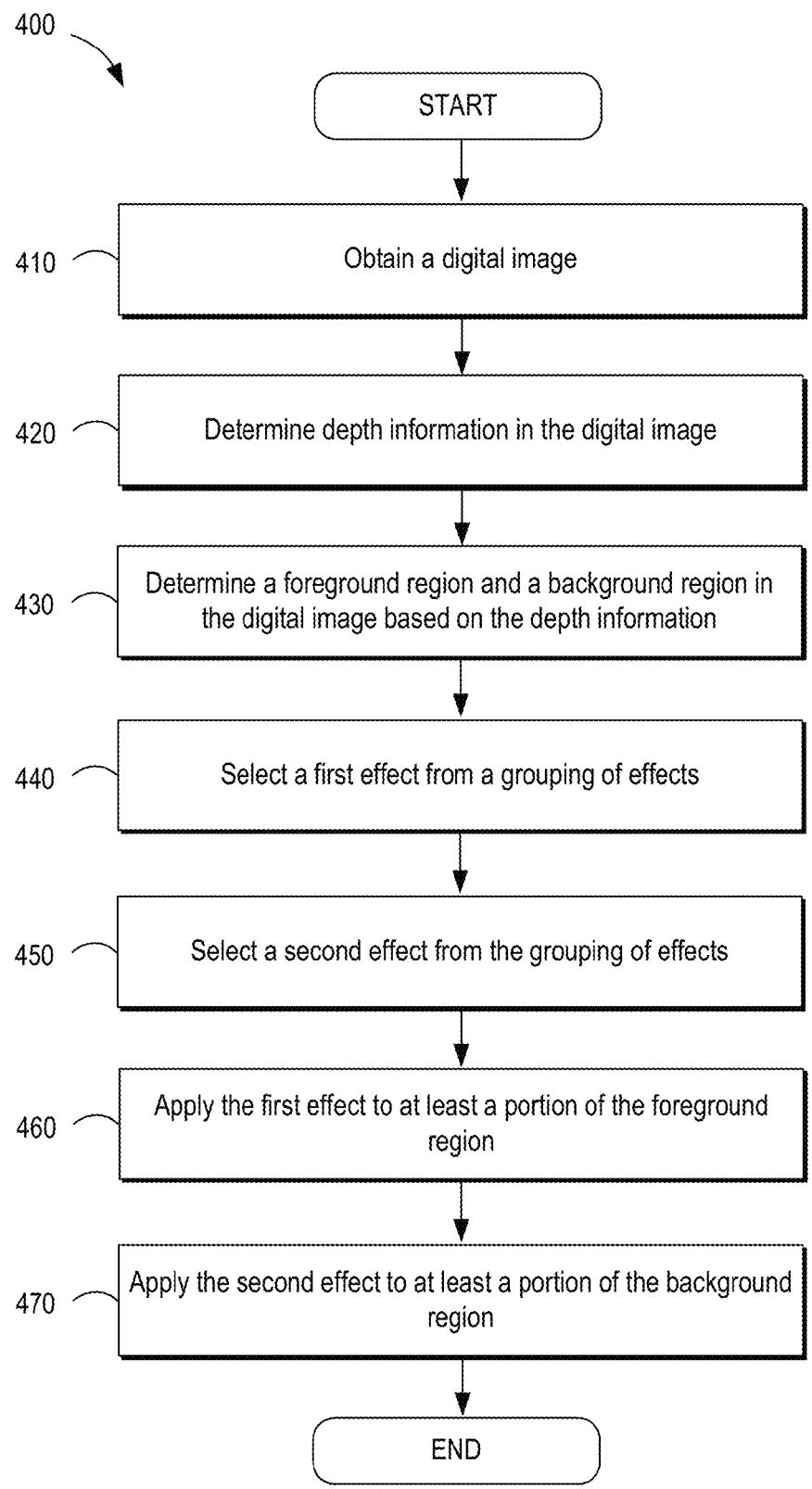
FIG. 4 is a top-level flowchart illustrating examples of functionality implemented as portions of the media editing system of FIG. 1 for facilitating image editing according to various embodiments of the present disclosure.

Reference is made to FIG. 4, which is a flowchart 400 in accordance with one embodiment for automatically editing an input image. It is understood that the flowchart 400 of FIG. 4 provides merely an example of the many different types of functional arrangements that may be employed to implement the operation of the various components of the media editing system 102 (FIG. 1). As an alternative, the flowchart of FIG. 4 may be viewed as depicting an example of steps of a method implemented in the media editing system 102 according to one or more embodiments.

Beginning with block 410, the media interface 112 (FIG. 1) obtains a digital image, where the digital image may comprise, for example, a captured digital photo or a frame from a frame sequence in a video. In block 420, depth information corresponding to the digital image is determined. As an example, the depth information may comprise a depth map containing information relating to the distance of regions and/or objects in the digital image from the viewpoint of a camera.

In block 430, a foreground region and a background region in the digital image are determined based on the depth information. For some embodiments, the foreground and background regions may be determined based on a threshold depth value that serves as a demarcation point between the foreground and background regions.

In block 440, a first effect is selected from a grouping of effects, and in block 450, a second effect is selected from the grouping of effects. The grouping of effects may comprise a plurality of subgroups, where each subgroup includes at least a first effect and a second effect. In some instances, the subgroups of effects may be defined by a user where the user selects specific effects to be applied together to a given image.

In block 460, the first effect is applied to at least a portion of the foreground region. In block 470, the second effects are applied to at least a portion of the background region. For example, the first effect may be applied to one or more objects within the foreground region. Similarly, the second effect may be applied to one or more objects within the background region.

Figure 5:
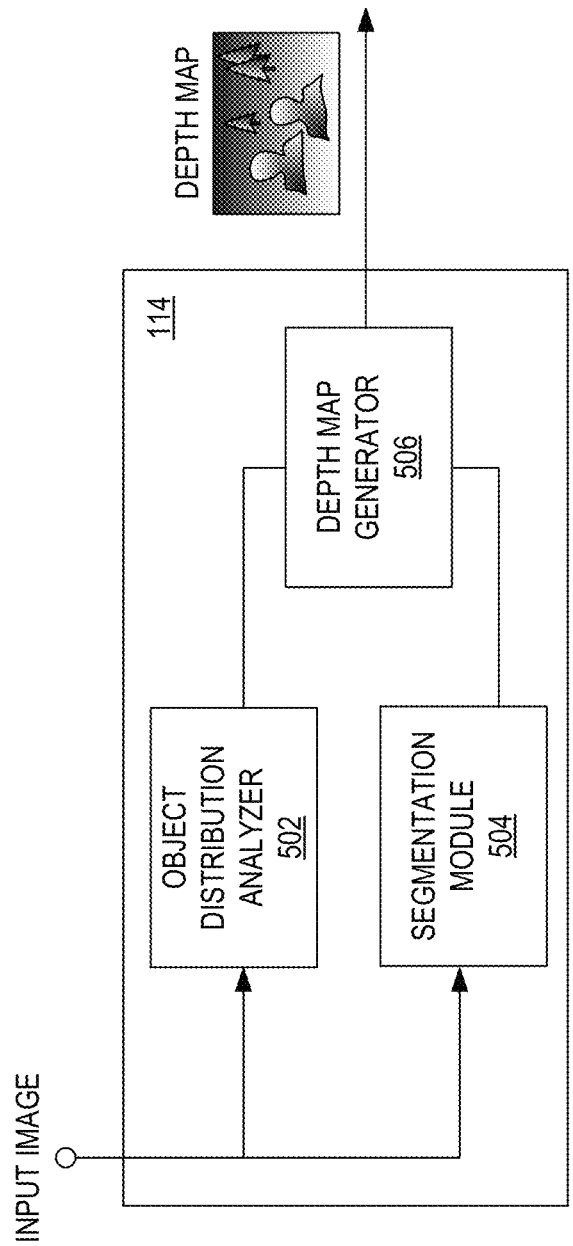
FIG. 5 illustrates components of the depth analyzer in the media editing system of FIG. 1 according to various embodiments of the present disclosure.

Reference is now made to FIG. 5, which illustrates components of the depth analyzer 114 in the media editing system 102 in FIG. 1. For some embodiments, the depth analyzer 114 includes an object distribution analyzer 502 configured to determine such information as sizes of similar objects, whether objects overlap, the shadow region(s) of objects, salient objects, facial features, identification of the sky and other background objects/regions, vanishing points, depth of field within the input image, and so on. The depth analyzer 114 may also include a segmentation module 504 configured to partition the input image into a series of segments in order to identify one or more objects within the input image. As an example, the segmentation module 504 may identify groups of pixels or sets of contours within the input image based on pixels that share similar attributes (e.g., color or intensity attributes). Edge detection techniques may also be applied to identify possible edges associated with objects. Thus, by identifying changes in lighting or color, size/shape, and so on, the depth analyzer 114 may identify one or more objects within the input image.

The depth map generator 506 receives data from the object distribution analyzer 502 and the segmentation module 504 and generates a depth map for the input image. The depth map contains information relating to distance of objects or regions within the input image from a viewpoint. The depth map may be encoded according to a variable number of bit depths. As an example, for some input images, a 1-bit depth map may be utilized while for other input images, an 8-bit depth map may be utilized to represent a higher number of distances. The x and y values for a given pixel correspond to the location in the depth map, while the z value corresponds to the associated depth.

Figure 6:
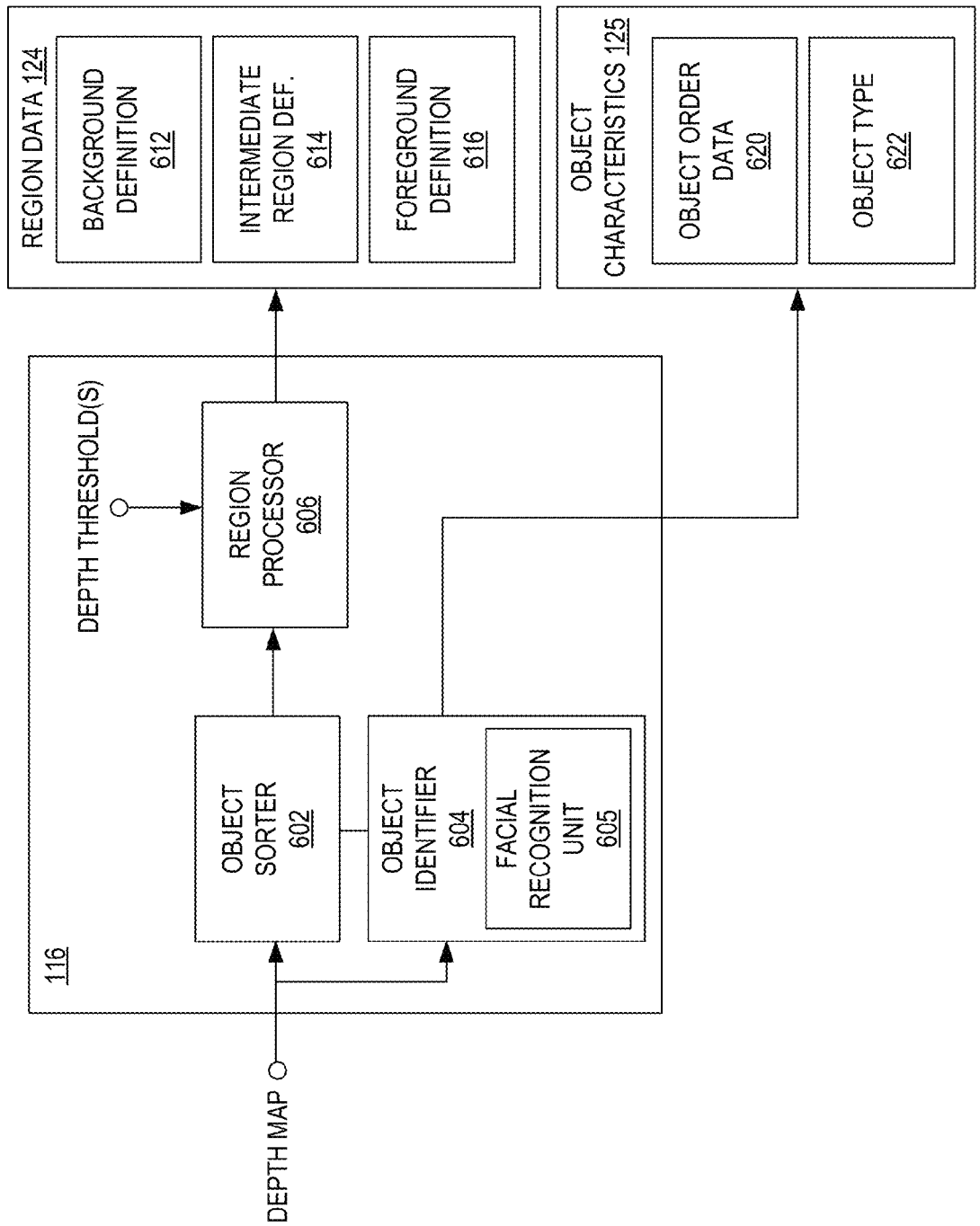
FIG. 6 illustrates components of the region parser in the media editing system of FIG. 1 according to various embodiments of the present disclosure

Reference is now made to FIG. 6, which illustrates components of the region parser 116 in the media editing system 102 in FIG. 1. For some embodiments, the region parser 116 includes an object sorter 602 configured to process the depth map and determine a relative order of objects identified within the input image. As an example, the object sorter 602 may be configured to compile a list of sorted objects starting with objects closest to the plane where the camera is located and ranging to objects that are farthest away from the camera.

The region parser 116 may also include an object identifier 604 configured to categorize objects. As an example, the object identifier 604 may determine that certain objects within the input image correspond to individuals while other objects correspond to buildings or other background objects. In this regard, the object identifier 604 may further comprise a facial recognition unit 605 configured to identify faces of individuals within the input image by searching for facial features. Based on the content, the media editing system 102 (FIG. 1) may suggest or automatically apply a preselected subgroup of effects.

The region processor 606 in the region parser 116 outputs region data 124 that comprises a definition of both the foreground 616 and the background 612 within the input image. For some embodiments, the region data 124 comprises a depth mask that defines both the foreground 616 and the background 612. For example, the background definition 612 may specify a range of depth values corresponding to the background region. Similarly, the foreground definition 616 may specify a range of depth values corresponding to the foreground region. Furthermore, the depth threshold for determining whether an object lies in the foreground region or the background region may vary depending on such information as the minimum depth value and the maximum depth value associated with the media content.

For some embodiments, the region parser 116 may also generate an intermediate region definition 614 corresponding to a region and/or objects that lie between the foreground region and the background region. As shown, the region parser 116 also outputs object characteristics 125 that include object order data 620 generated by the object sorter 602 and object type data 622 that specifies the type of objects determined by the object identifier 604.

Figure 7:
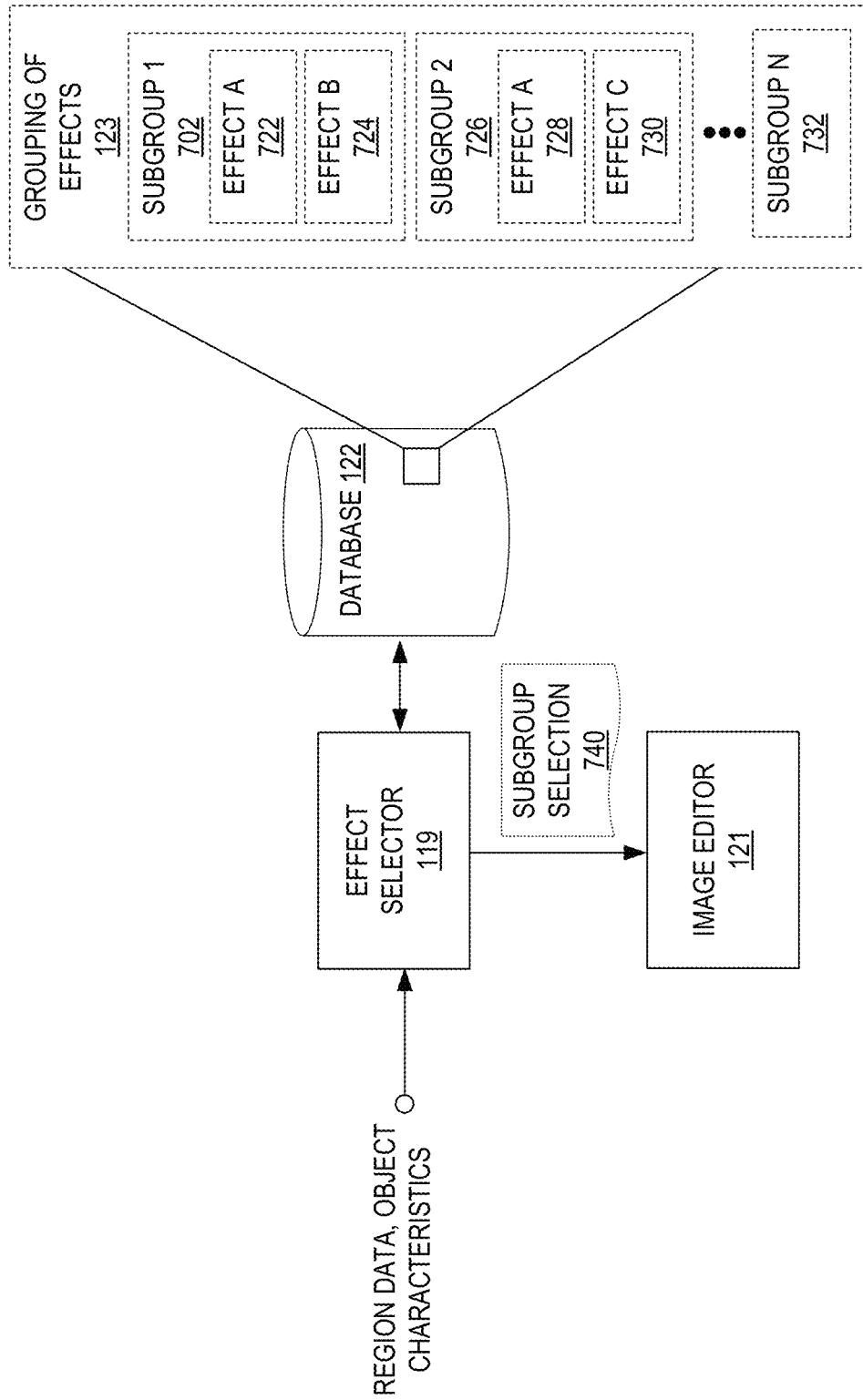
FIG. 7 illustrates operation of the effect selector 119 in the media editing system of FIG. 1 according to various embodiments of the present disclosure

Reference is now made to FIG. 7, which illustrates operation of the effect selector 119 in the media editing system 102 in FIG. 1. For some embodiments, the effect selector 119 receives the region data and object characteristics from the region parser 116 (FIG. 6) and accesses a database 122 maintained by the media editing system 102. Note that the database 122 may be representative of a plurality of databases as can be appreciated. The data in the database 122 includes a grouping of effects 123 that may be applied to the input image.

For some embodiments, the grouping of effects 123 comprises a plurality of subgroups 702, 726, 732, where each subgroup 702, 726, 732 includes at least two effects to be applied to the same input image. In particular, one effect is automatically applied to the foreground region or specific objects within the foreground region, while another effect is automatically applied to the background region or specific objects within the background region. As shown, the first subgroup 702 includes a first effect 722 and a second effect 724. Similarly, the second subgroup 726 includes a first effect 728 and a second effect 730. Note that in the example shown, the same effect ("Effect A") is part of two different subgroups 702, 726. In this regard, each subgroup 702, 726, 732 may comprise a set of unique effects or may share a common effect with another subgroup 702, 726, 732.

The effect selector 119 generates a subgroup selection 740 based on the region data and the object characteristics. As an example, if certain types or categories of objects (e.g., faces of individuals) are identified by the object identifier 604 (FIG. 6), then the effect selector 119 may be configured to select a specific subgroup from among all the subgroups 702, 726, 732 of effects. For some embodiments, the subgroups 702, 726, 732 of effects comprise pre-selected effects. For example, a noise effect may be paired with an edge enhancement effect to further distinguish the foreground region from the background region. As an example, a blurring effect may be applied to the background region while a sharpening effect is applied to objects in the foreground region. As another example, the background region may be converted to black and white while the saturation level of the foreground region is increased. In this regard, effects may be pre-selected in order to complement or enhance one other and therefore achieve an overall desired effect. While the effects group may be user-defined, the effects group may comprise subgroups of effects such that if the user selects one particular effect to be applied to a region, another predetermined effect is automatically applied to the other region. The subgroup selection 740 is then sent to the image editor 121.

Figure 8:
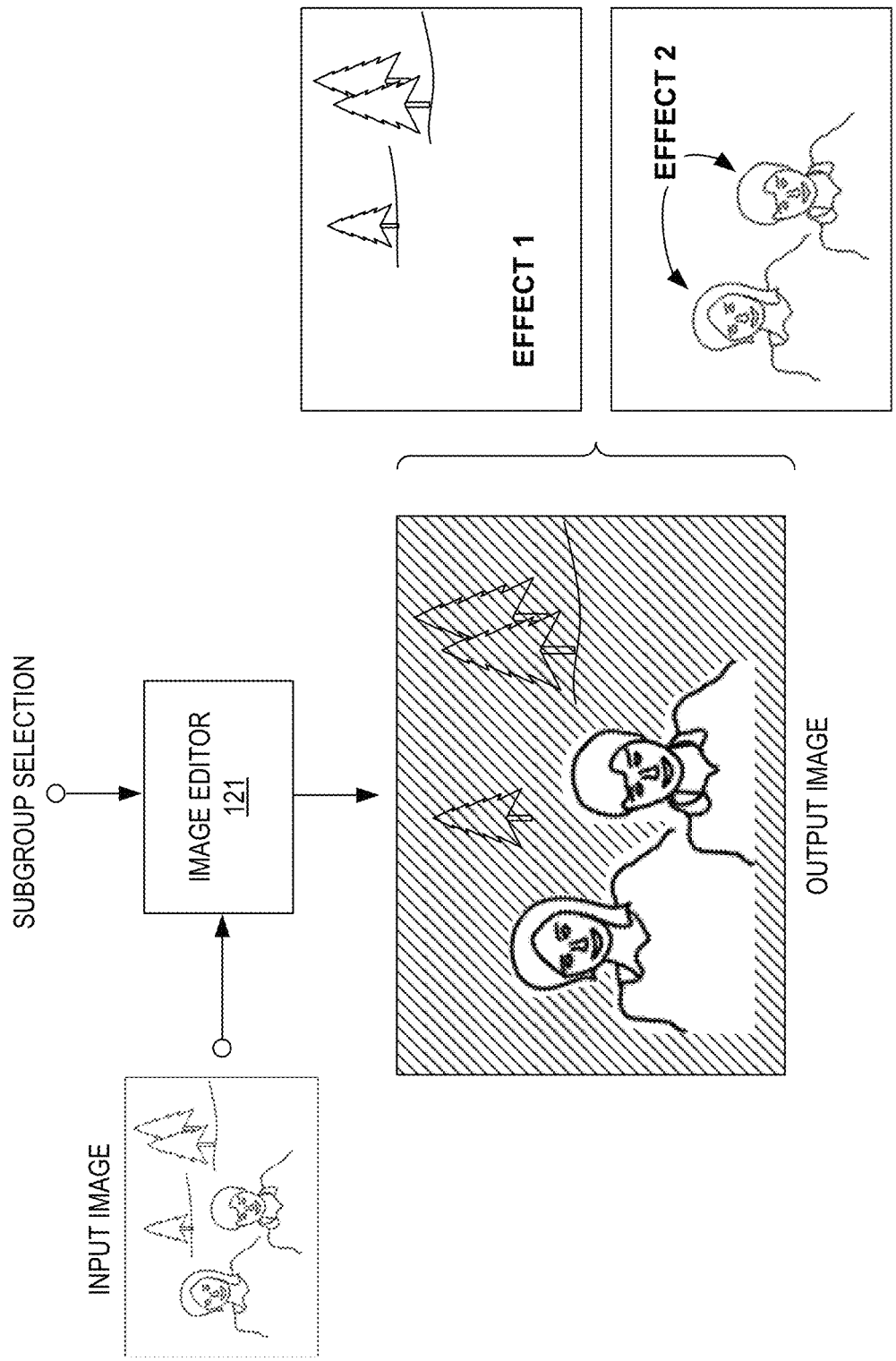
FIG. 8 illustrates operation of the image editor in the media editing system of FIG. 1 according to various embodiments of the present disclosure.

Reference is made to FIG. 8, which illustrates operation of the image editor 121. The image editor 121 receives a subgroup selection from the effect selector 119 (FIG. 7) and applies the effects in the subgroup selection to the input image to generate an output image. Assume for purposes of illustration that the input image comprises a foreground region that includes two individuals. In the example shown, "Effect 1" is applied to the entire background region, while "Effect 2" is applied to the two individuals in the foreground region to generate an output image with multiple effects incorporated. For some implementations, the image editing system 102 (FIG. 1) may be configured to prompt the user and allow the user to either apply the effect to an entire region (e.g., foreground region) or to apply the effect to one or more specific objects within the region (e.g., one or more individuals).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a media editing apparatus, comprising:
   obtaining a digital image;
   obtaining depth information in the digital image;
   obtaining a foreground region and a background region in the digital image based on the depth information;
   selecting a first effect from a grouping of effects;
   selecting a second effect from the grouping of effects;
   wherein selecting the first effect and selecting the second effect from the grouping of effects comprises selecting a sub-group of pre-selected effects based on at least one of: at least one object identified in the foreground region; and at least one object identified in the background region;

applying the first effect to at least a portion of the foreground region and applying the second effect to at least a portion of the background region.

2. The method of claim 1, wherein applying the first effect to at least the portion of the foreground region comprises:
identifying at least one object in the foreground region; and
applying the first effect to the at least one object in the foreground region.

3. The method of claim 2, wherein applying the second effect to at least the portion of the background region comprises:
identifying at least one object in the background region; and
applying the second effect to the at least one object in the background region.

4. The method of claim 1, wherein the grouping of effects further comprises sub-groups of effects, wherein each sub-group comprises a pre-selected effect for the foreground region and a pre-selected effect for the background region.

5. The method of claim 1, further comprising obtaining a plurality of effects specified by a user, wherein the user further specifies sub-groups of effects among the plurality of effects.

6. The method of claim 1, wherein obtaining depth information in the digital image comprises one of: analyzing depth information and extracting depth data embedded in the digital image.

7. The method of claim 6, wherein analyzing the depth information comprises:
applying image segmentation based on color distribution to identify objects in the digital image; and
determining a relative depth of each of the objects, wherein the depth information in the digital image comprises information relating to at least one of: sizes of similar objects, overlapping regions between objects, shadow regions of objects, salient objects, facial features, background objects, vanishing points, and depth of field in the digital image.

8. The method of claim 6, wherein determining the foreground region and the background region in the digital image based on the depth information comprises:
determining a depth map based on the relative depth of identified objects; and
comparing, utilizing the depth map, each of a plurality of identified objects to a predetermined depth threshold to generate region data, the region data including a depth mask.

9. The method of claim 8, wherein the region data identifies the foreground region and the background region.

10. A media editing system, comprising:
a processor; and
at least one application executable in the processor, the at least one application comprising:
a media interface configured to obtain a digital image;
a depth analyzer configured to determine depth information in the digital image;
a region parser configured to determine a foreground region and a background region in the digital image based on the depth information;
an effect selector configured to select a first effect from a grouping of effects, the effect selector being further configured to select a second effect from the grouping of effects, wherein the effect selector selects the first effect and the second effect from the grouping of effects by selecting a sub-group of pre-selected effects based on at least one of: at least one object identified in the foreground region; and at least one object identified in the background region; and
an image editor configured to apply the first effect to at least a portion of the foreground region, the effect selector configured to apply the second effect to at least a portion of the background region.

11. The system of claim 10, wherein the image editor applies the first effect to at least the portion of the foreground region by identifying at least one object in the foreground region; and applying the first effect to the at least one object in the foreground region.

12. The system of claim 11, wherein the image editor applies the second effect to at least the portion of the background region by identifying at least one object in the background region; and applying the second effect to the at least one object in the background region.

13. The system of claim 10, wherein the grouping of effects further comprises sub-groups of effects, wherein each sub-group comprises a pre-selected effect for the foreground region and a pre-selected effect for the background region.

14. The system of claim 10, wherein the grouping of effects comprises a plurality of effects specified by a user.

15. The system of claim 10, wherein the depth analyzer determines depth information in the digital image by determining an object distribution in the digital image; applying image segmentation based on the object distribution to identify objects in the digital image; and determining a relative depth of each of the identified objects.

16. The system of claim 15, wherein the region parser determines the foreground region and the background region in the digital image based on the depth information by determining a depth map based on the relative depth of each of the identified objects; comparing, utilizing the depth map, each of the identified objects to a predetermined depth threshold to generate region data, the region data including a depth mask; and applying the first effect and the second effect based on the depth mask.

17. A non-transitory computer-readable medium embodying a program executable in a computing device, comprising:
code that obtains a digital content comprising one of: a digital image; and a frame in a video sequence;
code that generates a depth mask based on depth information in the digital content;
code that determines an order of objects in the digital content based on a relative depth of each object specified in the depth mask;
code that categorizes each of the objects as one of a background object and a foreground object based on the order of objects;
code that selects a first effect and a second effect from a grouping of effects;
code that applies the first effect to at least a portion of the foreground objects; and
code that applies the second effect to at least a portion of the background objects.

18. The non-transitory computer-readable medium of claim 17, wherein the grouping of effects further comprises sub-groups of effects, wherein each sub-group comprises a pre-selected effect for the foreground region and a pre-selected effect for the background region.

19. The non-transitory computer-readable medium of claim 17, further comprising code that obtains a plurality of effects specified by a user, wherein the user further specifies sub-groups of effects among the plurality of effects.

* * * * *